US006487587B1

(12) United States Patent
Dubey

(10) Patent No.: US 6,487,587 B1
(45) Date of Patent: Nov. 26, 2002

(54) METHOD AND SYSTEM FOR DATA PROCESSING BY PROXY

(75) Inventor: Nidheesh Dubey, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/259,196

(22) Filed: Mar. 1, 1999

(51) Int. Cl.$^7$ ............................................. G06F 13/00
(52) U.S. Cl. ...................................... 709/213; 709/203
(58) Field of Search ................... 709/213, 10; 702/213, 702/203

(56) References Cited

U.S. PATENT DOCUMENTS 5,748,897 A * 5/1998 Katiyar .................. 395/200.49
5,818,448 A * 10/1998 Katiyar ....................... 345/335
6,049,877 A * 4/2000 White ......................... 713/201
6,240,442 B1 * 5/2001 Domenikos et al. ........ 709/203

* cited by examiner

Primary Examiner—David Wiley
(74) Attorney, Agent, or Firm—O'Melveny & Myers LLP

(57) ABSTRACT

A client/server computer system comprising: a communication link; a plurality of server computers including a dual-role proxy server computer connected to the communication link; a storage device connected to the communication link for storing information; and at least one client computer connected to the communication link. The client computer generates requests to the proxy server computer for processing certain information on the storage device. In response, the proxy server computer accesses said information on the storage device and associates program instructions to the information for processing the information. Thereafter, the proxy server computer processes the information according to the program instructions.

19 Claims, 4 Drawing Sheets

METHOD AND SYSTEM FOR DATA PROCESSING BY PROXY

FIELD OF THE INVENTION

The present invention relates to client/server processing, and in particular, to client/server processing by proxy.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, Solaris, Java, JavaOS, JavaStation, HotJava Views and all Java-based trademarks and logos are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

BACKGROUND OF THE INVENTION

There are times when a computer user uses more than one type of computer platform. A computer platform is the combination of the computer hardware (processor) and operating system that comprises a particular computer system. For example, a computer system with a Sparc processor manufactured by Sun Microsystems and running the Solaris or Unix operating system is a platform, A computer with an Intel processor and running the operating system known as Windows is considered to be another platform. An Intel computer running the DOS operating system is considered to be another platform. Other platforms include Motorola processor based computers.

Consider a user using multiple platforms all connected via a network. The user may be in the position of having a file on a first computer platform that can only be processed on a second computer platform. This can occur, for example, when a user has an email account on the first platform and receives mail that includes a file from another platform, the user may need to transfer the file to the second platform before being able to view the file. This is time consuming and frustrating to the user.

To alleviate this problem, existing network systems provide server computers capable of processing data files requiring programs that are incompatible with the processing platform of one or more client computers. Such server computers can comprise dedicated or emulator server computers connected to the communication link, and can be within close spatial proximity of client computers utilized by users for convenience. However, a major disadvantage of such systems is that the user must transfer and locate a desired data file at one of such server computers. Specifically, in the above example, the user must utilize the server computer to locate the desired data file on a storage device in the network, and launch a required program for processing the data file which is compatible with the processing platform of the server computer.

There is, therefore, a need for a method and system for a user at a client computer to request processing of user selected information by a server computer using simple and efficient steps.

SUMMARY OF THE INVENTION

In one embodiment, the present invention provides a client/server computer system, comprising: a communication link; a plurality of server computers including a dual-role proxy server computer connected to the communication link; a storage device connected to the communication link for storing information; and at least one client computer connected to the communication link. The client computer generates requests to the proxy server computer for processing certain information on the storage device. In response, the proxy server computer accesses said information on the storage device and associates program instructions to the information for processing the information. Thereafter, the proxy server computer processes the information according to the program instructions.

The client computer includes a user interface module for: (1) allowing a user to select said information on the data storage device and to specify the type of processing for said information, and (2) generating a request to the proxy server computer, wherein the request includes data identifying said information and the type of processing specified by the user. Further, the proxy server computer includes an association module for selecting the program instructions appropriate for processing said information. The proxy server computer further includes an access module for locating and accessing the information on the storage device via the communication link. As such, once the user locates the desired information on the storage device via the client computer, the client computer requests the proxy server computer server selected by the user to process the user selected information with the appropriate program instructions for the selected information ate the proxy server computer.

The client/server system can include a plurality of proxy server computers connected to the communication link; and the client computer generates one or more requests to one or more of the proxy server computers. Each request is directed to a proxy server computer for processing certain information on the storage device. In response the selected proxy server computer accesses said information on the storage device and associates program instructions to said information for processing the information. Thereafter, the proxy server computer processes said information according to the program instructions. Preferably, the client program user interface module allows the user to select said information on the data storage device and specify the type of processing for said information and select a proxy server computer. The client computer then generates a request to the specified proxy server computer, wherein the request includes data identifying said information and the type of processing specified by the user.

BRIEF DESCRIPTION OF THE DRAWINGS

These and other features, aspects and advantages of the present invention will become better understood with regard to the following description, appended claims and accompanying drawings where:

DETAILED DESCRIPTION OF THE PREFERRED EMBODIMENT

The invention is a method and apparatus data processing by proxy. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Figure 1:
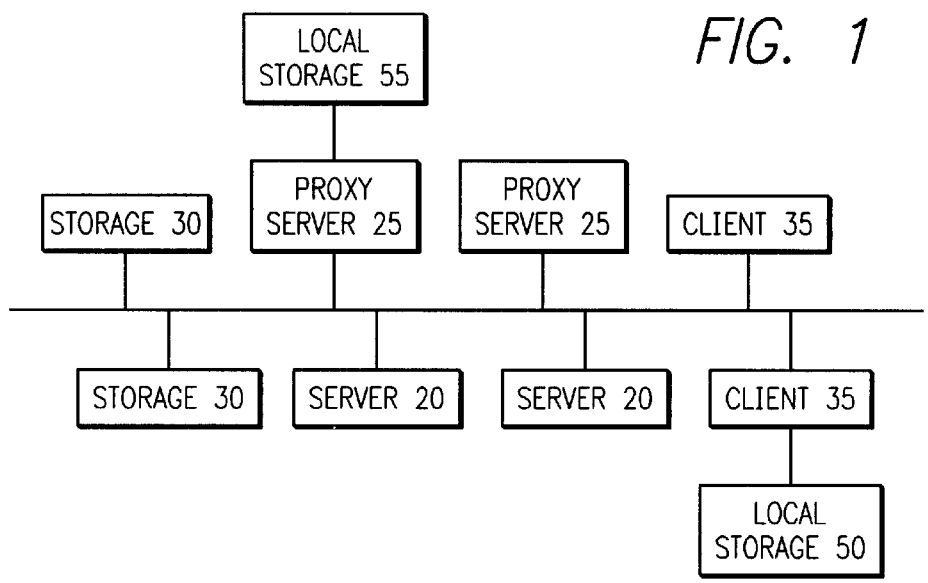
FIG. 1 shows a block diagram of an example computer system architecture in which the present invention can be implemented.

Referring to the drawings, several embodiments of the present invention are described herein. FIG. 1 shows a block diagram of an example computer system architecture in which the present invention can be implemented. The computer system 10 comprises a client/server network system including: a communication link 15; a plurality of server computers 20 including at least one dual-role proxy server computer 25 with local storage 55 connected to the communication link 15; at least one storage device 30 connected to the communication link 15 for storing information; and at least one client computer 35 with local storage 50 connected to the communication link 15. Each storage device can include a tape or disk drive.

The present invention provides for data processing by proxy via a computer program designated as a proxy module, comprising a client program module and a server program module. The client and server program modules of the proxy module configure the client and proxy server computers, 35, 25 respectively, to perform the operations of the invention.

A user interacts with the client computer 35 using the client program module running on the operating system environment (e.g. Solaris) in the client computer 35. The client program module allows a Solaris user at the client computer 35 to locate PC documents and executables in a local storage device 50 or network storage 30, and generates a request to open such documents and executables in a proxy server computer 25 running, for example, the Windows' operating system. Such a proxy server computer 25 can comprise a Solaris emulator such as Sun PCI, Sun PC, SoftWindows, RealPC or an actual deskside personal computer (PC). The Solaris emulator computer servers and the deskside personal computer servers are interconnected to the communication link 15.

In this example embodiment, PC documents refer to documents created by software tools designed to run on the DOS or the Windows operating system, and to computer programs designed to run on said operating systems. Solaris does not process documents associated with the DOS and Windows operating systems, and a user wishing to process PC documents or executables must do so in computers running or emulating the DOS or Windows operating systems.

The Proxy modules allow a Solaris user to enjoy better Solaris/PC integration. (By contrast, in conventional Solaris systems, the user has no way of processing a PC document from within a client computer 25 running Solaris because the Solaris processing environment does not process PC documents. As such, the user must turn to a deskside PC server 20 running the Windows operating system, find the PC document on a file system, and then open it on the deskside PC server 20 using a Windows compatible word processor running on the deskside PC server 20. Therefore, the user is duplicating the tasks of locating the desired document in Solaris, and then locating it again from within the deskside PC server 20.)

The present invention allows the Solaris client computer 35 to "order" a deskside PC server 20 or a Solaris emulator server 20 to open the PC document. As such, the invention in effect turns the deskside PC or the Solaris emulator server 20 into a Solaris application that can open certain types of files such as PC files. This allows for more efficient and easier handling and processing of such files, and provides a better integrated processing environment, wherein the user need not use the deskside PC or the Solaris emulator to duplicate the task of finding a desired document which the user has already performed in the Solaris client computer 35. When the user selects a PC document and specifies an operational command at the client computer 35, the Solaris processor recognizes that it cannot process the PC document at the client computer 35 and launches the client program module in the Solaris environment in the client computer 35.

Figure 4:
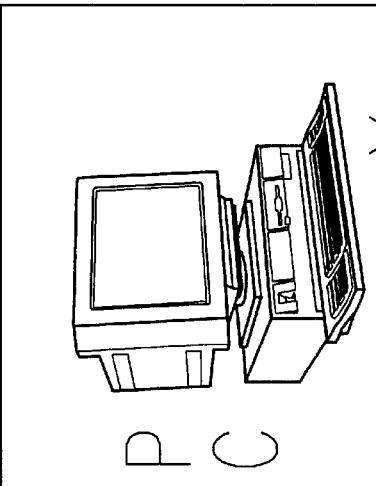
FIG. 4 shows an example dialog box for configuring a proxy server computer of FIG. 1 according to the present invention.
Figure 5:
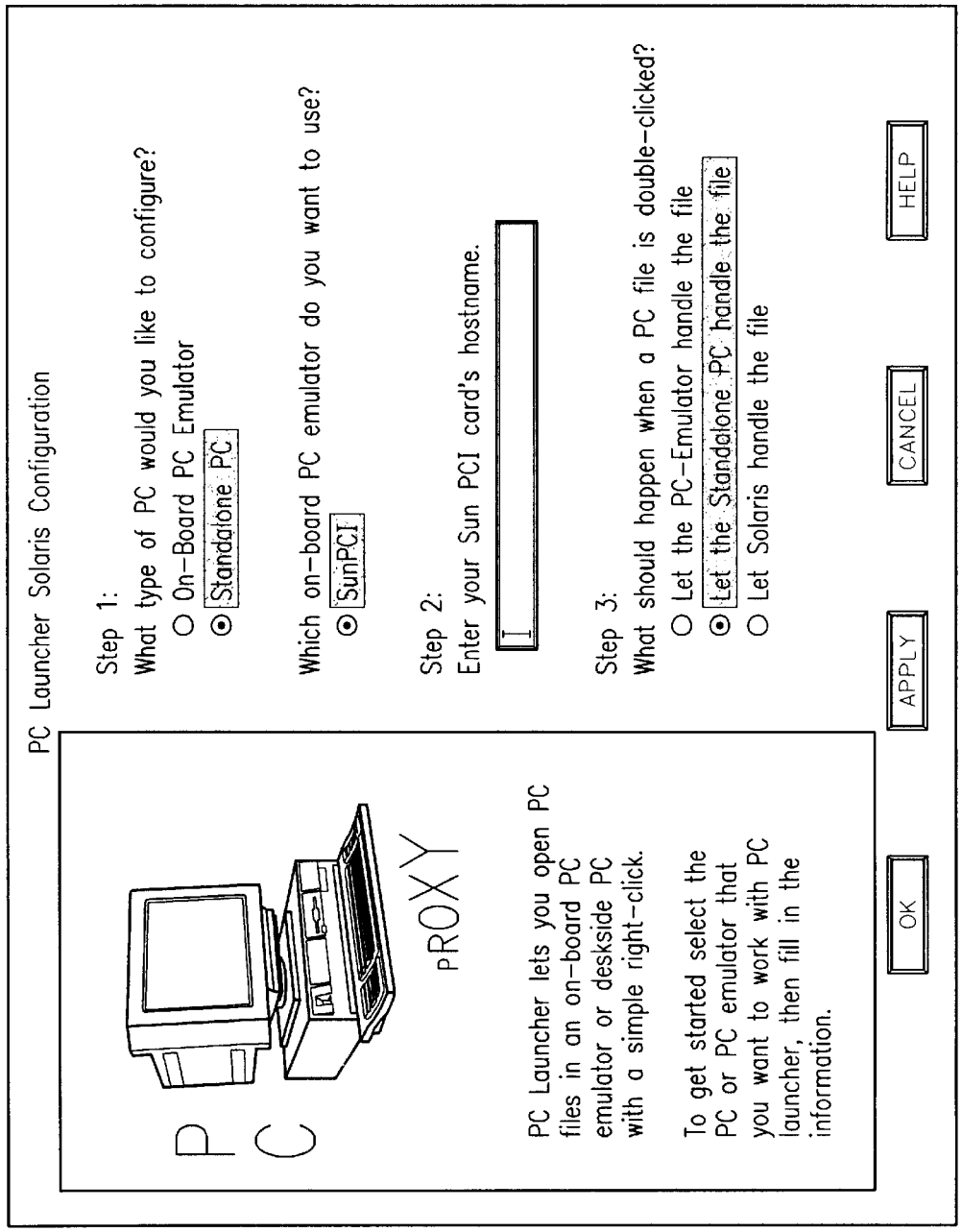
FIG. 5 shows an example dialog box for configuring another proxy server computer of FIG. 1 according to the present invention.

The client program module provides a graphical user interface (GUI) for a Solaris user to process information as described above. Referring to FIGS. 4 and 5, the client program module provides an Installation and Options dialog box, wherein in the left area of the dialog box are operational instructions for the user, and in the right area of the dialog box are controls that allow the user to configure the client program module to work with each type of proxy server computer 25, including: a deskside PC or a Solaris emulator. The controls are organized as a series of numbered steps to help guide the user through the configuration process. The user interface can be different depending on the type of proxy server computer 25 being configured, namely a deskside PC or a Solaris emulator.

FIG. 4 shows an example dialog box for configuring a Solaris emulator server 25. When the user selects the emulator option, the dialog box is tailored to configure an emulator proxy server computer 25. Specifically: (1) the drop-down list box in Step 1 is enabled and the choice box is filled with the emulator options that the user currently has installed, (2) the wording in Step 2 is changed to ask the user for the chosen emulator's hostname, and (3) asks the user what should happen when the file of interest is double clicked. In other words, which emulation option should be invoked to handle the file. In this example, four emulator proxy server computers 25 are provided: Sun PCI, Sun PC, SoftWindows and RealPC.

All of the emulator server computers 25 require the same information from the user, including hostname. For each additional emulator proxy server computer 25, the dialog box can be modified to obtain the necessary configuration information from the user. FIG. 5 shows an example dialog box for configuring deskside proxy module server computer 25. When the user selects the deskside PC option, the dialog is tailored to configure a deskside proxy module server 25. Specifically: (1) the choice box in Step 1 is disabled, (2) the wording in Step 2 is changed to ask the user for the deskside PC's hostname, and (3) the wording in Step 3 is changed to ask the user for option to follow on double click.

Thereafter, upon locating a desired PC document, the user can click on the PC document list to open the document, wherein the user is provided with two menu items such as: (1) open in emulator proxy server computer 25, and (2) open in deskside proxy module server computer 25. The first menu item opens the selected document in the user's configured emulator proxy server computer 25, and the second menu item opens the document in the user's chosen deskside PC server computer 25. If the selected proxy server computer 25 is not properly configured, the client program module opens a corresponding configuration dialog box shown above, selects the proper proxy server computer 25 in Step 1 radio buttons, and obtains the needed configuration information from the user.

Once the configuration information is provided, the user clicks Apply which makes the changes or "OK" which makes the changes and dismisses the configuration dialog box. The client program module makes the necessary changes to the user's home directory and then attempts to contact the server program module running on the selected proxy server computer 25 via the communication link 15. If the contact attempt is successful, the client program module of the client computer 35 attempts handshaking with the server program module of the proxy server computer 25. However, if the initial contact attempt fails, the user is provided with the option to reopen the configuration dialog box for further configuration operations. The user is also provided with a message box informing the user that contact cannot be established with the proxy server 25, and asking the user to click OK once the problem has been remedied. Once contact and handshaking with the server program module of the proxy server 25 are successful, the server program module of the server computer 25 is provided with the document information and the operation requested by the user.

For example, the client program module sends a request to the server program module, wherein the request includes the name of the document file and an operation command for the file (e.g., open, view, print, etc.). The server program module associates the proper operational application program for the requested command with the file name, and launches the application which the handle of the file. The application then access a network storage device 30, locates the file and performs the requested command (e.g., opening the file). The operational application program can reside on the local storage 55 of the proxy server computer 25, or on a network storage device 30.

The server program module selects the proper operation application program from among a set of operation application programs, by examining the type of the document selected by the user. For example, if the document is a text document created in Microsoft Word, the server program module invokes Microsoft Word with the name of the document for processing the document. Similarly, if the selected document is an executable program for the Windows operating system, the server program module launches the executable program in the Windows operating system in the proxy server computer 25.

The user can configure the client program module to send requests to more than once proxy server computer 25. Typically, a user configures the client program module to handle a set of proxy servers 25. The user can also modify existing configurations using the client program module configuration dialog boxes described above. Further, the user can utilize different client computers 25 for processing PC documents. For each client computer 35, the user utilizes the client program module in that client computer to run the appropriate configuration dialogue boxes to utilize the desired proxy server computers 25.

In the above example, since each emulator proxy server 25 has its own hostname, the user must reconfigure when moving to a different client computer 35. When invoked, the client program module detects that the user has moved, and displays a Yes/No dialog to provide the use with the option of reconfiguring. Thereafter, the sequence of steps is similar to the configuration steps described above. Thus, as soon as the Solaris-side client proxy PC module configuration is complete, the client program module is able to immediately open the requested documents. Moving to a new client computer 35 is likely to move a user away from the user's deskside PC server 25. The client program module detects that it is in a new host machine, and displays a Yes/No dialog asking the user if the user would like to select a new deskside PC server 25. Clicking Yes runs the configuration dialog boxes described above, and clicking No cancel the operation.

In another aspect of the present invention, the client computer 35 provides the user with the option of requesting a proxy server computer 25 to process a selected document or executable, even if the client computer 35 is capable of processing the selected document or executable. As such, in the above example, when a user selects a file in the client computer 35, the Solaris processor invokes the client program module to allow the user to select a proxy server 25, even if the Solaris environment is capable of processing the selected document. Therefore, the user can form an integrated environment of client and proxy server computers 35, 25, respectively, for selectively launching processing of documents and executables by proxy servers 25.

Figure 3:
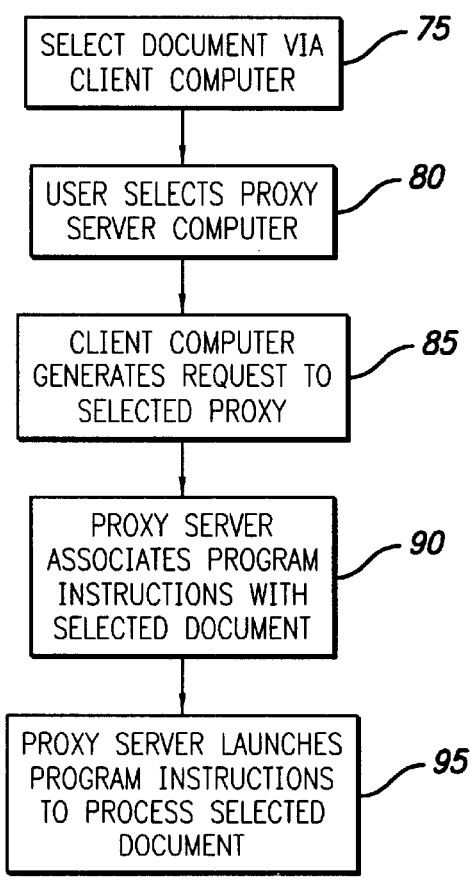
FIG. 3 shows an example flowchart of processing steps by a client computer and a proxy server computer in FIG. 1 according to the present invention.

According to the example steps shown in FIG. 3, a user utilizes a client interface of the client computer 35 to select desired information, such as data file, on the data storage device 30 and to specify a desired processing operation on the data file (step 75). If the client computer 35 is not capable of performing the requested operation, the client computer 35 obtains information from the user where the user specifies a proxy server computer 25 for performing the desired operation on the data file (step 80). The client computer 35 then generates a request to the selected proxy server computer 25, where the request includes data identifying the data file operation specified by the user (step 85). The client computer 35 then transmits the request to the selected proxy server computer 25 via the communication link 15 for processing.

Referring to FIG. 3, the proxy server computer 25 is configured by a processing platform including an operating system and computer programs for processing, including interaction with a user via the interface module 55, and for interaction with other computers in the network system via the communication link 15. Upon receiving the request from the client computer 35, the proxy server computer 25 associates program instructions appropriate for processing the selected data file on the processing platform of the proxy server computer 25 (step 90). The proxy server computer 25 associates the program instructions based on the type of the selected data file. The program instructions can reside on the proxy server computer's storage device 30, or on another storage device 50 or computer in the network system. The proxy server computer 25 then locates and accesses the selected data file in the storage device 50 where the data file resides via the communication link 15, and launches the program instructions at the proxy server computer 25 for processing the selected data file (step 95).

Embodiment of Computer Execution Environment (Hardware)

Figure 2:
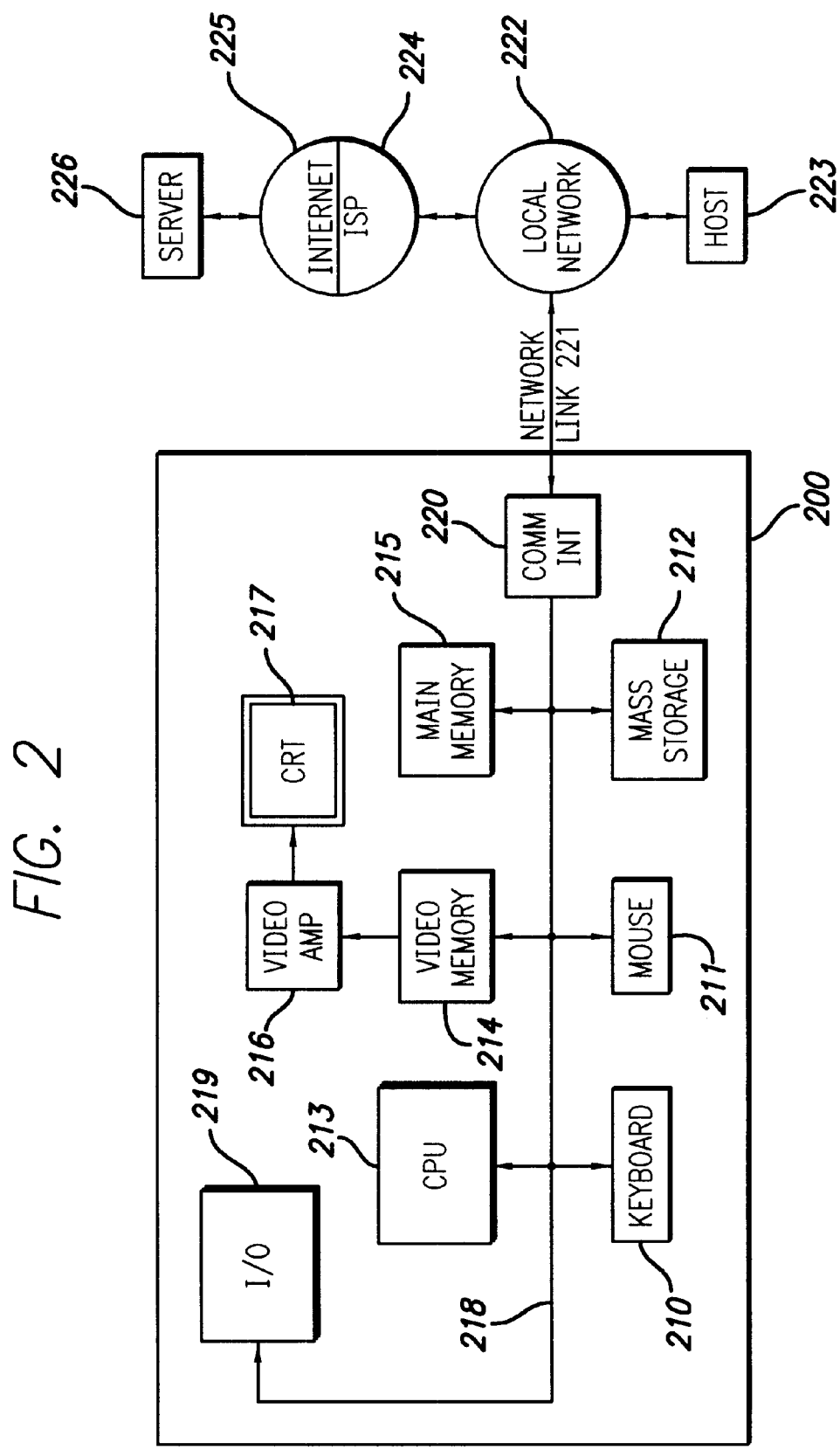
FIG. 2 illustrates an example computer system of the present invention.

An embodiment of the invention can be implemented as computer software in the form of computer readable code executed on a general purpose computer such as computer 200 illustrated in FIG. 2, or in the form of bytecode class files executable within a Java™ runtime environment running on such a computer, or in the form of bytecodes running on a processor (or devices enabled to process bytecodes) existing in a distributed environment (e.g., one or more processors on a network). The computer system of FIG. 2 also may be used as an example of the client, proxy, and/or server computers of FIG. 1.

A keyboard 210 and mouse 211 are coupled to a system bus 218. The keyboard and mouse are for introducing user input to the computer system and communicating that user input to processor 213. Other suitable input devices may be used in addition to, or in place of, the mouse 211 and keyboard 210. I/O (input/output) unit 219 coupled to system bus 218 represents such I/O elements as a printer, A/V (audio/video) I/O, etc.

Computer 200 includes a video memory 214, main memory 215 and mass storage 212, all coupled to system bus 218 along with keyboard 210, mouse 211 and processor 213. The mass storage 212 may include both fixed and removable media, such as magnetic, optical or magnetic optical storage systems or any other available mass storage technology. Bus 218 may contain, for example, thirty-two address lines for addressing video memory 214 or main memory 215. The system bus 218 also includes, for example, a 64-bit data bus for transferring data between and among the components, such as processor 213, main memory 215, video memory 214 and mass storage 212. Alternatively, multiplex data/address lines may be used instead of separate data and address lines.

In one embodiment of the invention, the processor 213 is a microprocessor manufactured by Sun Microsystems, Inc., such as the SPARC™ microprocessor, or a microprocessor manufactured by Motorola, such as the 680X0 processor, or a microprocessor manufactured by Intel, such as the 80X86, or Pentium processor. However, any other suitable microprocessor or microcomputer may be utilized. Main memory 215 is comprised of dynamic random access memory (DRAM). Video memory 214 is a dual-ported video random access memory. One port of the video memory 214 is coupled to video amplifier 216. The video amplifier 216 is used to drive the cathode ray tube (CRT) raster monitor 217. Video amplifier 216 is well known in the art and may be implemented by any suitable apparatus. This circuitry converts pixel data stored in video memory 214 to a raster signal suitable for use by monitor 217. Monitor 217 is a type of monitor suitable for displaying graphic images.

Computer 200 may also include a communication interface 220 coupled to bus 218. Communication interface 220 provides a two-way data communication coupling via a network link 221 to a local network 222. For example, if communication interface 220 is an integrated services digital network (ISDN) card or a modem, communication interface 220 provides a data communication connection to the corresponding type of telephone line, which comprises part of network link 221. If communication interface 220 is a local area network (LAN) card, communication interface 220 provides a data communication connection via network link 221 to a compatible LAN. Wireless links are also possible. In any such implementation, communication interface 220 sends and receives electrical, electromagnetic or optical signals which carry digital data streams representing various types of information.

Network link 221 typically provides data communication through one or more networks to other data devices. For example, network link 221 may provide a connection through local network 222 to local server computer 223 or to data equipment operated by an Internet Service Provider (ISP) 224. ISP 224 in turn provides data communication services through the world wide packet data communication network now commonly referred to as the "Internet" 225. Local network 222 and Internet 225 both use electrical, electromagnetic or optical signals which carry digital data streams. The signals through the various networks and the signals on network link 221 and through communication interface 220, which carry the digital data to and from computer 200, are exemplary forms of carrier waves transporting the information.

Computer 200 can send messages and receive data, including program code, through the network(s), network link 221, and communication interface 220. In the Internet example, remote server computer 226 might transmit a requested code for an application program through Internet 225, ISP 224, local network 222 and communication interface 220.

The received code may be executed by processor 213 as it is received, and/or stored in mass storage 212, or other non-volatile storage for later execution. In this manner, computer 200 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

The communication link can comprise a TCP/IP network or other network communication protocols known to practitioners in the art.

Although the present invention has been described in considerable detail with regard to the preferred versions thereof, other versions are possible. Therefore, the appended claims should not be limited to the descriptions of the preferred versions contained herein.

What is claimed is:

1. A client/server computer system, comprising:

a communication link;

at least one server computer connected to said communication link, wherein said server computer comprises a dual-role proxy server computer;

a storage device for storing information thereon, wherein said storage device is connected with said communication link; and at least one client computer connected with said communication link, said client computer generating requests to said proxy server computer for processing certain information on said storage device, said proxy server computer accessing said information on said storage device and associating program instructions to said information on said storage device for processing said information on said storage device, wherein said proxy server computer processes said information on said storage device according to said program instructions;

wherein said at least one client computer includes a user interface module for:

allowing a user to select said information on said data storage device and to specify a type of processing for said information on said storage device; and generating a request to said proxy server computer, said request including data identifying said information on said storage device and said type of processing specified by said user; and wherein said proxy server computer processes said information on said storage device without needing said user to again locate said information on said storage device.

2. The system of claim 1, wherein said requests are generated by said client computer when said client computer is determined to be incompatible with said information on said storage device.

3. The system of claim 1, wherein said requests can be generated by said client computer even when said client computer can process said information on said storage device.

4. The system of claim 1, wherein said user interface module comprises a graphical user interface (GUI) having a dialog box, said dialog box comprising a first area for providing user directions and a second area for configuring said proxy server.

5. The system of claim 1, wherein said data identifying said information further comprise data to locate said information on said storage device.

6. The system of claim 5, wherein said storage device comprises a local storage device connected with said client computer, wherein said local storage device is only connected with said communication link through said client computer, and wherein said information on said storage device is stored on said local storage device.

7. The system of claim 1, wherein said proxy server computer includes an association module for selecting said program instructions appropriate for processing said information on said storage device and an access module for locating and accessing said information on said storage device based on said data identifying said information.

8. The system of claim 1, wherein said communication link comprises a local network.

9. The system of claim 1, wherein:
said at least one server computer includes a plurality of proxy server computers connected to said communication link; and
said at least one client computer generates one or more requests to at least one of said plurality of proxy server computers, each request being directed to a proxy server computer for processing a selected information on said storage device, said proxy server computer accessing said selected information and associating a selected program instruction to said selected information for processing said selected information, wherein said proxy server computer processes said selected information according to said selected program instruction;
wherein said at least one client computer includes a user interface module for:
allowing a user to select said information, to specify a type of processing for said selected information, and to specify a proxy server computer; and
generating a request to said specified proxy server computer, said request including data identifying said selected information and said type of processing specified by said user.

10. The system of claim 1, wherein said proxy server computer includes a processing platform for processing said information on said storage device.

11. The system of claim 10, wherein said processing platform comprises an operating system appropriate for operating said program instructions and wherein said program instructions are appropriate for processing said information on said storage device.

12. The system of claim 11, wherein said at least one client computer includes a second processing platform having a second operating system.

13. The system of claim 12, wherein said second operating system is incompatible with said information on said storage device.

14. The system of claim 1, wherein said at least one client computer includes an operating system and wherein said program instruction is designed for operating on a second operating system.

15. The system of claim 14, wherein said proxy server computer emulates said second operating system for said client computer.

16. A method for data processing by proxy comprising:
selecting a data file on a storage device via a client computer;
specifying a desired processing operation on said selected data file via said client computer;
specifying a proxy server computer for performing said desired operation on said selected data file via said client computer;
generating a request to said proxy server computer via said proxy server computer, wherein said request includes data identifying said desired operation;
transmitting said request from said client computer to said proxy server computer via a local network;
receiving said request by said proxy server;
associating program instructions appropriate for processing said selected data file on a processing platform of said proxy server computer, wherein said proxy server computer is configured with said processing platform and wherein said processing platform includes an operating system and said program instructions; and
launching said program instruction at said proxy server to process said selected data file, without needing a user to again select said selected data file on said proxy server.

17. The method of claim 16, wherein said specifying said proxy server computer occurs when said client computer is not capable of performing said desired processing operation.

18. A client/server computer system, comprising:
a local network;
at least one server computer connected with said communication link;
a storage device for storing information thereon, wherein said storage device is connected with said communication link; and
at least one client computer connected with said communication link, said client computer generating requests to said proxy server computer for processing certain information on said storage device, said proxy server computer accessing said information on said storage device and associating program instructions to said information on said storage device for processing said information on said storage device, wherein said proxy server computer emulates a processing platform having a operating system and processes said information on said storage device according to said program instructions and wherein said program instructions is designed to run on said operating system.

19. The system of claim 18, further comprising means for allowing a user to select said information on said storage device to be processed by said proxy server computer and to specify a type of processing for said information on said storage device, wherein said requests generated by said client computer for processing said information on said storage device also include data identifying said information on said storage device and said type of processing specified by said user.

* * * * *